US 6,658,922 B2

(12) United States Patent
Leigh et al.

(10) Patent No.: US 6,658,922 B2
(45) Date of Patent: Dec. 9, 2003

(54) OPTICAL EQUIPMENT ASSEMBLIES AND TECHNIQUES INDEXED TO A COMMON SPINDLE

(75) Inventors: Joseph Leigh, Campbell, CA (US); David S. Kuo, Palo Alto, CA (US); Li-Ping Wang, Fremont, CA (US); Nobuo Kurataka, Campbell, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 154 days.

(21) Appl. No.: 09/996,552

(22) Filed: Nov. 27, 2001

(65) Prior Publication Data

US 2002/0112534 A1 Aug. 22, 2002

Related U.S. Application Data

(60) Provisional application No. 60/270,415, filed on Feb. 20, 2001, and provisional application No. 60/312,923, filed on Aug. 16, 2001.

(51) Int. Cl.[7] ................................................. G01B 5/28
(52) U.S. Cl. ....................................................... 73/105
(58) Field of Search ........................ 73/105; 324/207.11, 324/207.24, 207.25; 356/625, 630, 600, 614

(56) References Cited

U.S. PATENT DOCUMENTS 6,370,107 B1 * 4/2002 Hosaka et al.

* cited by examiner

*Primary Examiner*—Robert Raevis
(74) *Attorney, Agent, or Firm*—Moser, Patterson & Sheridan, LLP

(57) ABSTRACT

A method and apparatus for scanning a media is described. More particularly, polarization detector and an atomic force microscope are coupled to a common platform indexed to a spindle. Optionally, an optical microscope may be coupled to the common platform. The polarization detector is used to detect a magnetic image, such as at least a portion of a servo pattern, of the media, and the atomic force microscope, which may be aligned using the magnetic image, is used with a magnetic microscopy module to scan the media. Accordingly, magnetic imagery may be achieved with indexing to a single spindle for positional consistency as between equipment. Moreover, the polarization detector may further be configured to detect scattered light for providing topographic imagery of the media.

20 Claims, 7 Drawing Sheets

OPTICAL EQUIPMENT ASSEMBLIES AND TECHNIQUES INDEXED TO A COMMON SPINDLE

CROSS-REFERENCE TO RELATED APPLICATIONS

This application claims benefit of United States provisional patent application, application Ser. No. 60/270,415, filed Feb. 20, 2001, and U.S. provisional patent application, application Ser. No. 60/312,923, filed Aug. 16, 2001, each of which is incorporated by reference herein in its entirety.

BACKGROUND OF THE INVENTION

1. Field of the Invention

The present invention generally relates to optical equipment assemblies and techniques, and more particularly to disc media metrology.

2. Description of the Related Art

A form of an information storage and retrieval device is a hard disc drive ("disc drive"). A disc drive is conventionally used for information storage and retrieval with computers, data recorders, redundant arrays of independent discs (RAIDs), multi-media recorders and the like. A disc drive comprises one or more disc media.

Each disc media comprises a substrate upon which materials are deposited to provide a magnetically sensitive surface. In forming the magnetically sensitive surface, a servo pattern or more particularly servo pattern media, may be formed on such substrate. A servo pattern media conventionally is a pattern of raised features, such as posts or columns. In a servo pattern, position error signal (PES) marks may be formed. Such PES marks conventionally are a pair of contiguous or inter connected posts. In addition to such servo pattern media, another form of pattern media that may be formed on a substrate is bit pattern media. A bit pattern or bit pattern media is an arrangement of posts or columns for storing bits of information.

As disc media storage requirements increase, namely, density is enhanced, topographic features whether for servo pattern media, bit pattern media or other media become smaller. For example, PES marks in bit patterns may be formed below 500 nanometers in lateral dimension. Moreover, as such posts become smaller in lateral dimension, spacing between posts also decreases. Thus, viewing such posts, as well as regions between posts, by conventional means is not practical. For example, a conventional interference based microscope uses a monochromatic light source of approximately 550 nanometers. Because the wavelength of the light source is larger than lateral dimension of the bit pattern elements themselves, a conventional interference based microscope is not sufficient for detailed resolution of topographic information associated with such pattern media.

Accordingly, an atomic force microscope (AFM) may be used to scan a disc media surface. An AFM scans not optically, but by physical touch using a contact probe. However, a difficulty arises in locating patterns for identifying a correct contact starting position for an AFM scan. Conventionally, a technician uses an interference-based microscope to locate a pattern; however, as mentioned above owing to resolution limitations of such conventional interference-based microscopes placement of probe tip is problematic. It should be appreciated that an AFM probe tip may be as narrow as 1 nanometer.

Not all servo pattern media uses topographic features. Some servo patterns are completely magnetically written. Conventional magnetically written servo patterns do not have topographic features, and thus rather than relying on spacing loss to generate a differential signal as in topographically patterned surfaces, magnetically written patterns rely on magnetic domain switching. Such magnetically written patterns are not detectable with topography. However, some servo patterns are a combination of topographic features and detectable magnetic information.

Accordingly, it would be desirable to provide for detection of servo or other patterns or features whether produced topographically or magnetically or both. More particularly, it would be desirable to provide for detection of servo patterns for determining a starting position for an AFM scan in order to obtain nano-scale image or other information.

SUMMARY OF THE INVENTION

The present invention generally provides method and apparatus for detecting a scanning a media. More particularly, an aspect of the present invention comprises a stage, a spindle configured to support the media, a first linear actuator connected to the stage, a second linear actuator connected to the stage, a polarization detector connected to the first linear actuator and positionable to scan the media, and an atomic force microscope connected to the second linear actuator and positionable to scan the media. The polarization detector is configured to provide optical energy incident on the media and to detect change in polarization of the optical energy reflected from the media to provide magnetic imagery of the media. The polarization detector and the atomic force microscope indexed to the spindle.

Another aspect of the present invention is a method for scanning a media. A polarization detector, an atomic force microscope, a platform, a first linear actuator, a second linear, and a spindle are provided. The spindle is centrally located with respect to the platform. The first linear actuator is coupled to the platform and the polarization detector, and the second linear actuator is coupled to the platform and the atomic force microscope. A servo pattern magnetically written to the media is detected with the polarization detector. The atomic force microscope is positioned in response to the servo pattern for the scanning of the media with the atomic force microscope.

Another aspect of the present invention is an apparatus for scanning a media comprising means for supporting and rotating the media; means for detecting polarization for providing a magnetic image of the media indexed to the means for supporting and rotating the media; means for probing the media for providing a topographic image indexed to the means for supporting and rotating the media; and means for providing a common rotatable platform for the means for detecting polarization and the means for probing.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
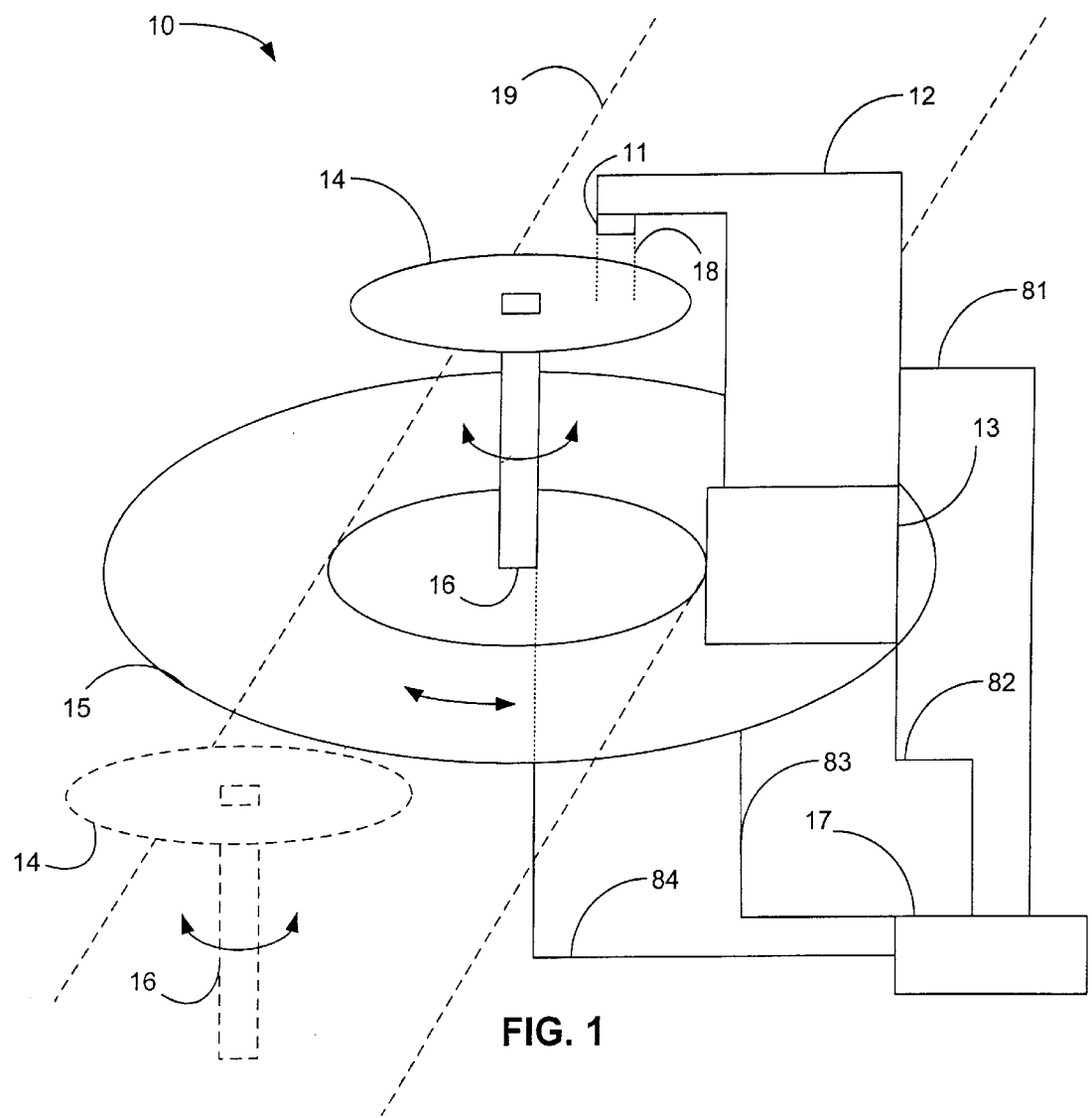
FIG. 1 is a block diagram of an exemplary portion of an embodiment of a metrology system in accordance with one or more aspects of the present invention.

Referring to FIG. 1, there is shown a block diagram of an exemplary portion of an embodiment of a metrology system 10 in accordance with one or more aspects of the present invention. Metrology system 10 comprises linear actuator 13, AFM 12, optical detector 11 which may be configured to detect scattered optical energy or polarization of optical energy or both, information processing system 17, spindle 16 and stage/platform 15. Spindle 16 is configured to be rotated. Conventionally, spindle 16 is rotated at approximately 10,000 revolutions per minute (RPM). Platform 15 may be, but need not be, configured to rotate. Located on spindle 16 is disc media 14. Accordingly, it should be appreciated that linear actuator assembly 13 may be used to position scatter detector 11 inwardly or outwardly with respect to disc media 14. Moreover, rotation of either or both stage 15 or spindle 16 may be used to position scatter detector 11 with respect to disc media 14, to initially align an AFM probe for AFM scanning of disc media 14. Optionally, a precision conveyor 19 having a plurality of spindles 16 attached to it may be used under control of information processing system 17.

Optical detector 11 may be optically coupled or in communication with an objective lens of AFM 12. Optical detector 11 is used to resolve servo spokes on disc media 14 with sufficient positional accuracy for moving AFM 12 to a starting position for topographic scanning, or magnetic force microscopy scanning as described below in more detail. Information collected by optical detector 11 and AFM 12 is provided to information processing system as one or more signals 81. Additionally, control signals as one or more of signals 81 may be provided from information processing system 17 to either or both optical detector 11 and AFM 12. Control of rotation of spindle 16 and platform 15 may be provided by signals 84 and 83, respectively, from information processing system 17. Control of linear movement by linear actuator 82 may be provided by information processing system 17 via signal 82. As optical detector 11, AFM 12, linear actuator assembly 13, spindle 16, rotatable platform 15, and information processing system 17 are known, unnecessary details regarding their configuration are not included herein in order to avoid obscuring one or more aspects of the present invention.

System or arrangement 10 may be used for automatically locating a topographically detectable pattern on disc media 14 using optical detector 11, for example to locate servo spokes. A differential optical signal is used. In other words, for light scatter, light reflected off of disc media 14 is affected by topography, and thus there is a difference in reflected light as detected by optical detector 11. The optical energy source for the light may be a laser or other high intensity light source. Though a separate optical energy source may be used, AFM 12 comprises an optical energy source for providing light incident to a surface of disc media 14. Similarly, a region of disc media 14 comprising magnetic transitions, for example in servo spokes, produces an altered light polarized state which is measurable by optical detector 11 when configured to detect polarization, namely, polarization detector 11.

Accordingly, optical detector 11 may be used to locate servo spokes or another pattern on disc media 14 as indicated from detected reflected light. If a disc substrate is optically transparent, then light scattering techniques need to be adapted. Notably, back side reflection or scatter from spokes causing ghosts peaks may be substantially removed or eliminated by narrowing or otherwise adjusting scatter channel 18, as is illustratively shown with a double-arrow line in FIG. 3, to limit or avoid detecting dispersed-reflected light at unwanted angles. Thus, forward scattered or reflected light, namely optical on axis light, is more likely to be detected than off axis, especially wide angle off axis, light by more narrowly limiting detector scatter channel 18. Once a pattern is located by either or both light scatter or polarization, an AFM probe or piezo, conventionally mounted to an objective lens of such an AFM, may be positioned to such pattern, and disc media 14 is rotated at a controlled speed on spindle 16.

Figure 2:
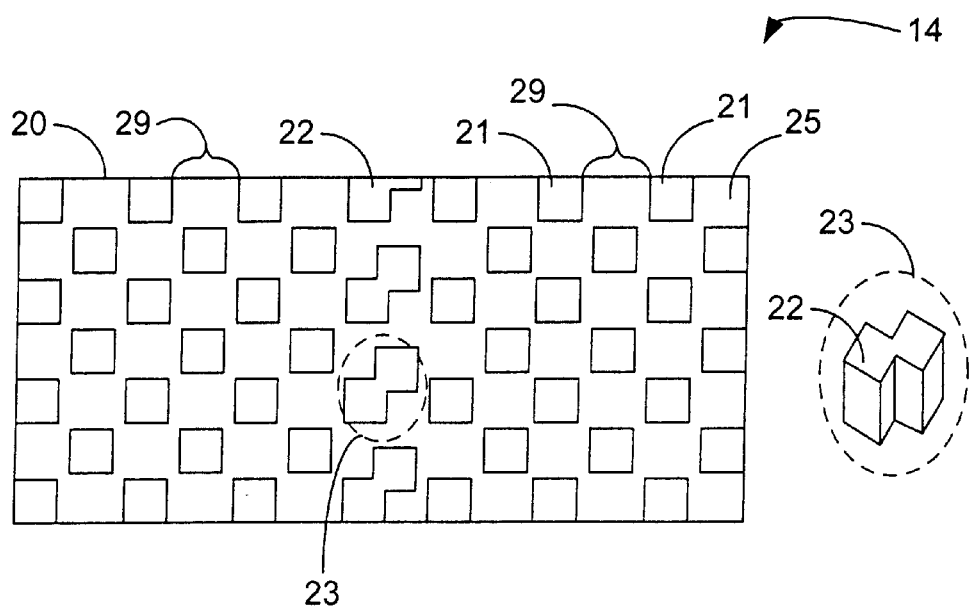
FIG. 2 is a block diagram of an exemplary portion of a topographically formed pattern of a disc media in accordance with the prior art.

Referring to FIG. 2, there is shown a block diagram of an exemplary portion of a topographically formed pattern 20 of a disc media 14 in accordance with the prior art. Topographically formed pattern 20 may be a portion of a servo spoke pattern having PES marks 22 and posts 21 separated by spaces 29. Lateral resolution of metrology system 10 is approximately two to three microns, which is sufficient to position its field of view to PES marks 22 embedded in servo spoke pattern 20. Notably, as indicated in cut-away three-dimensional view 23, PES marks 22 are dimensionally formed above a surface of a substrate assembly 25 of disc media 14. The same applies to posts 21. Accordingly, it should be appreciated that posts 21 and PES marks 22, formed with contiguous posts 21, which may or may not be overlapped, may be used to obtain topographic information.

Figure 3:
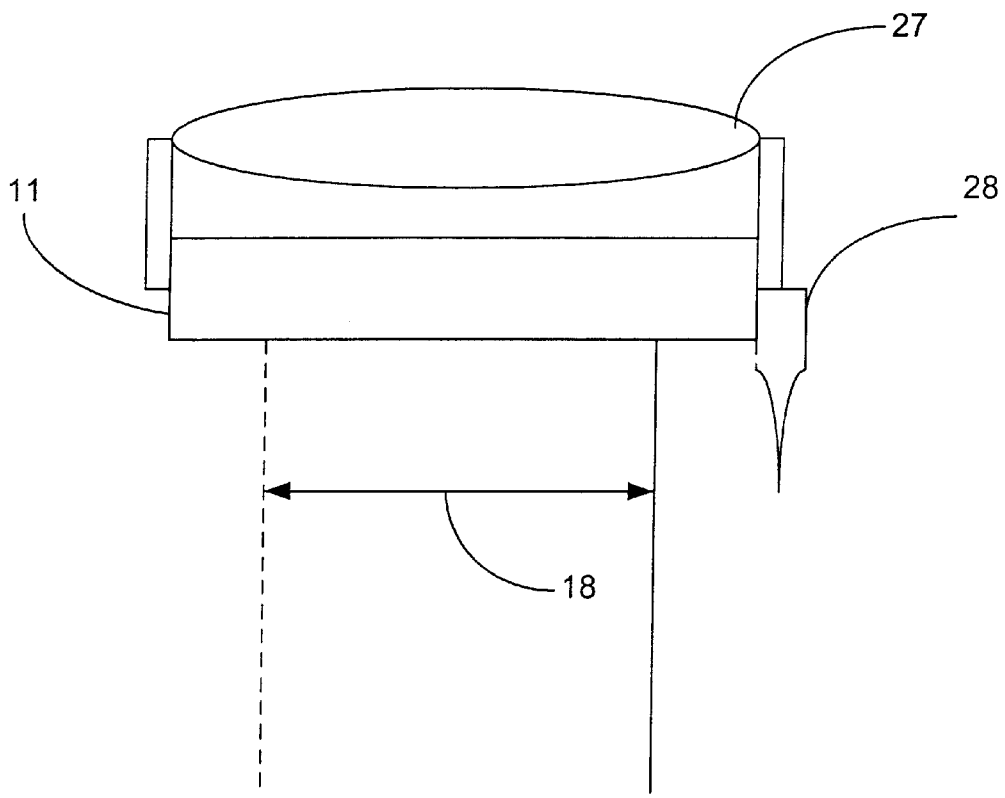
FIG. 3 is a block diagram of an exemplary embodiment of an AFM objective lens/optical detector/AFM probe tip in accordance with one or more aspects of the present invention.

Referring to FIG. 3, there is shown a block diagram of an exemplary embodiment of an AFM objective lens/optical detector/AFM probe tip in accordance with one or more aspects of the present invention. With continuing reference to FIG. 3 and renewed reference to FIG. 1, after resolving a pattern, such as servo spokes, AFM probe tip 28 coupled to objective lens 27 may be automatically positioned using at least one of linear actuator 13, rotatable spindle 16 and rotatable platform 15. For example, AFM objective lens 27 may be focally aligned to an edge of a servo spoke pattern as a starting reference for scanning. Scanning size may be five microns by five microns; however, other scan sizes may be used. Position tolerance of AFM objective lens 27 is approximately plus or minus seven microns. Notably, this is approximately two to three times the resolution of optical detector 11, which is approximately two to three microns. Thus, positioning is still dependent upon moving AFM objective lens 27 to a correct location, and accordingly by having AFM 12 and optical detector 11 physically connected and indexed to a single spindle 16, accurate positioning is enhanced. Moreover, information processing system 17 may be in communication with one or more of linear actuator 13, rotatable stage 15 and rotatable spindle 16 for controlled movement thereof.

Because scattered channel detection is coupled with an AFM scanning capability, the above-mentioned tolerances are dependent upon individual capabilities of instrumentation employed. An embodiment of metrology system 10 was built using a reflectometer from Candela OSA and AFM from JMAR. Furthermore, information processing system 17 may be programmed with peak detection software to determine spoke location for an automated approach to scanning servo patterns. Accordingly, information processing system may be a programmed computer.

Figure 4:
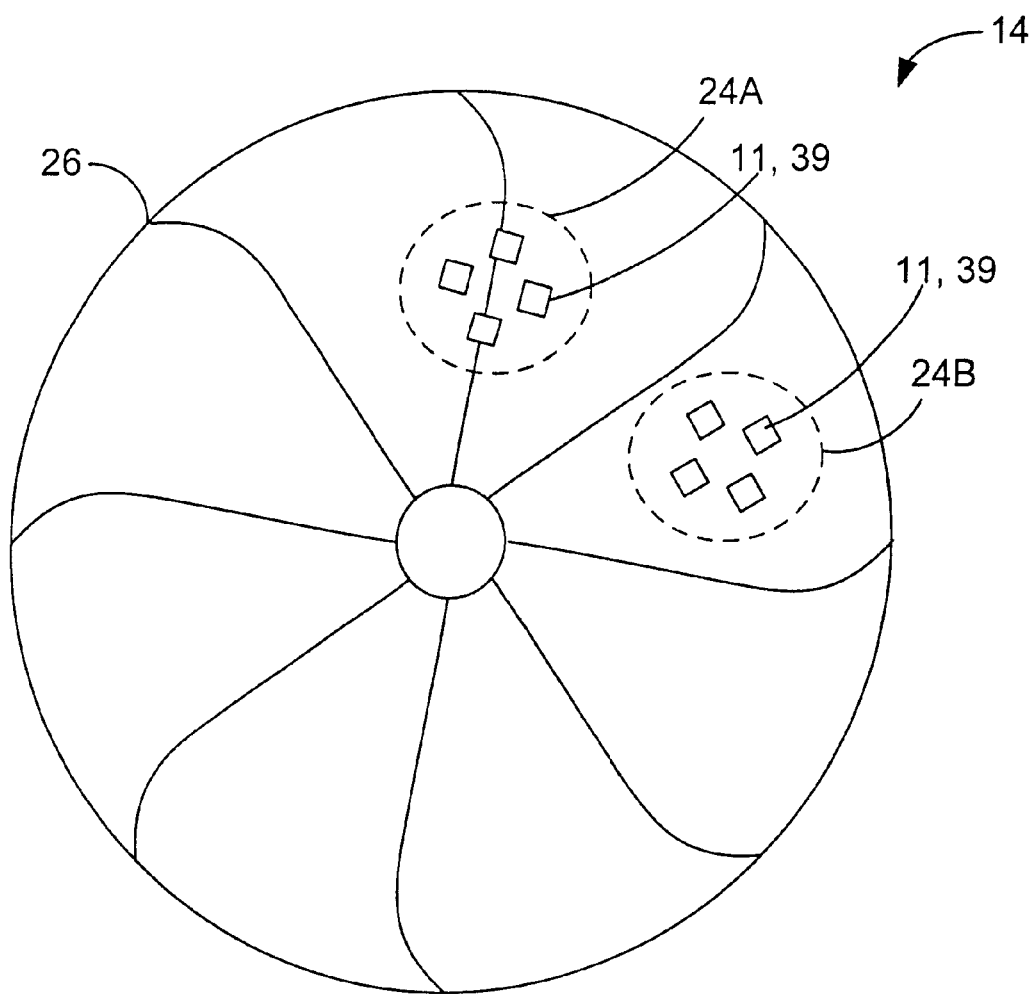
FIG. 4 is a block diagram of an elevated view of an exemplary embodiment of a disc media having multiple optical detectors in accordance with one or more aspects of the present invention.

Referring to FIG. 4, there is shown a block diagram of an elevational view of an exemplary embodiment of a disc media 14 having multiple optical detectors 11 in accordance with one or more aspects of the present invention. Disc media 14 comprises spokes 26. Two exemplary positions 24A and 24B for multiple detectors 11 are shown. Though four detectors 11 are shown in a square pattern alignment, fewer or more detectors 11 may be used and arranged as a square or other geometric pattern, such as a circle, a triangle, and the like depending on the number of detectors employed. Multiple detectors 11 gather additional data as compared to a single detector during a scatter detector scanning stage. Notably, multiple detectors 11 may be used without lengthening acquisition time as compared to just having one detector. Though detectors 11 are for detecting scattered light, they may be configured to detect polarization orientation of reflected light, as described in more detail below.

Scattered channel 18 may be used to generate topography-based map capable of resolving an area of as little as approximately three-square microns. By having multiple detectors arranged in a pattern, position of detectors 11 with respect to disc media 14 may be determined by identifying which detectors 11 detect a spoke pattern. Moreover, with respect to position 24B, if no detectors detect a spoke pattern, it may be determined that detectors 11 are positioned in an area of tracks of disc media 14. Thus, by using multiple detectors 11, spokes 26 may be identified more quickly than having a single detector 11. Additionally, by having multiple detectors 11, determining one or more defects, apparent size of a detected defect, and rapidity of scanning a surface area of disc media 14 are enhanced.

Figure 5:
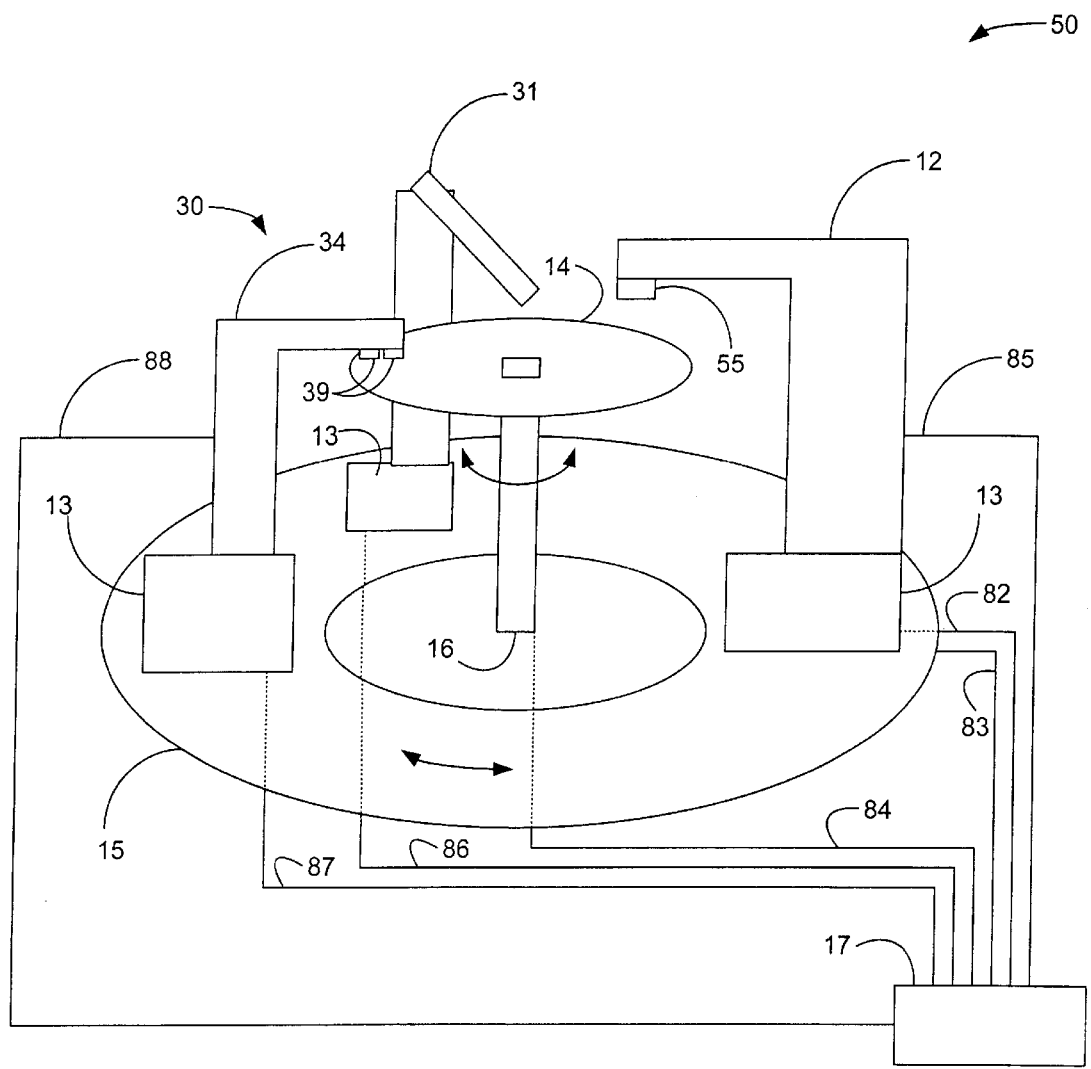
FIG. 5 is an exemplary embodiment of a metrology system in accordance with one or more aspects of the present invention.
Figure 6A:
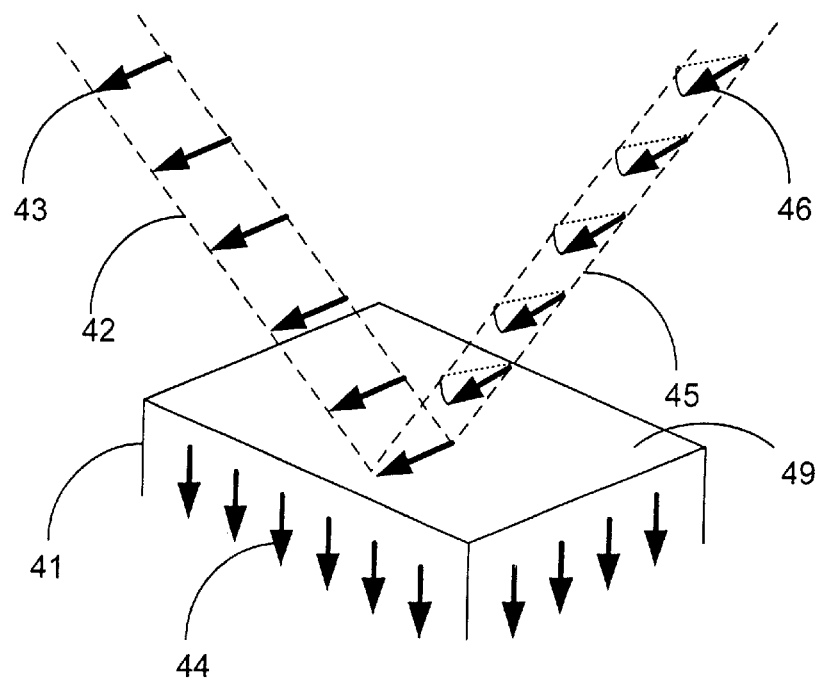
FIGS. 6A, 6B, 6C and 6D are polarization diagrams of a portion of a linearly polarized energy source reflecting off of a magnetically charged portion of disc media surface in accordance with the magnetic Kerr effect.
Figure 6B:
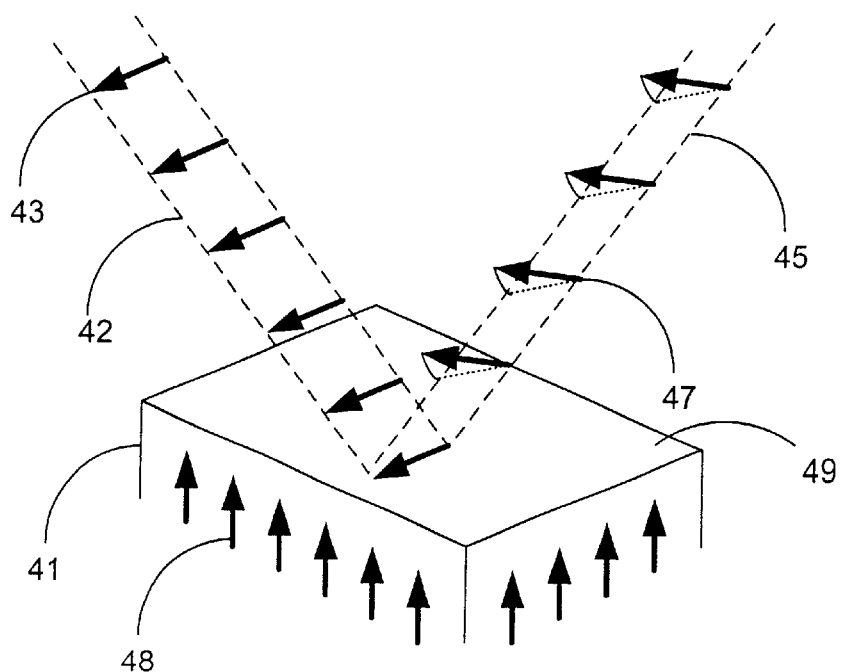
Figure 6C:
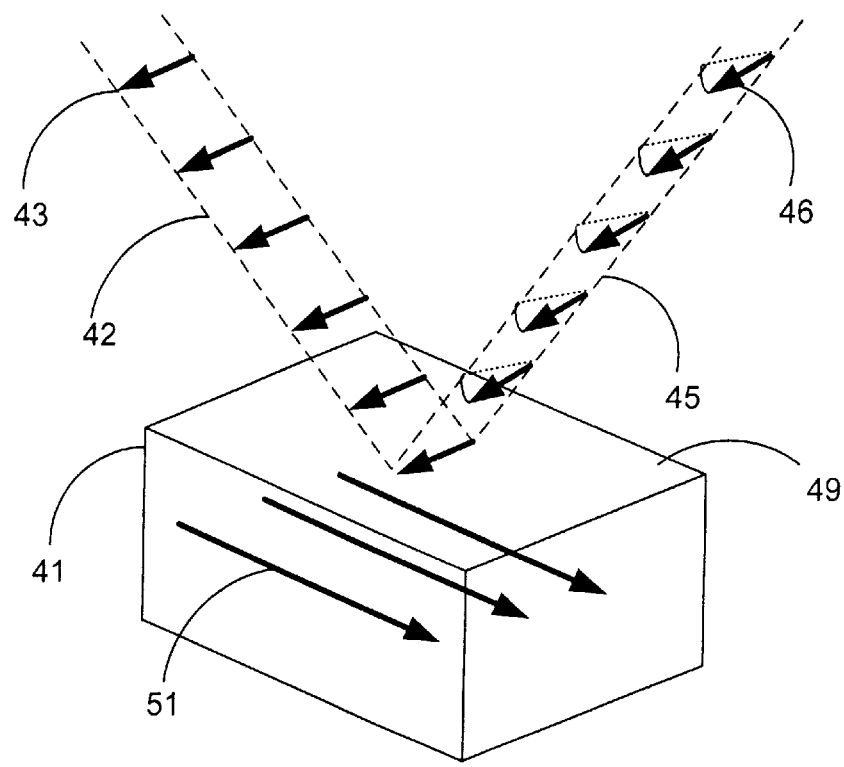
Figure 6D:
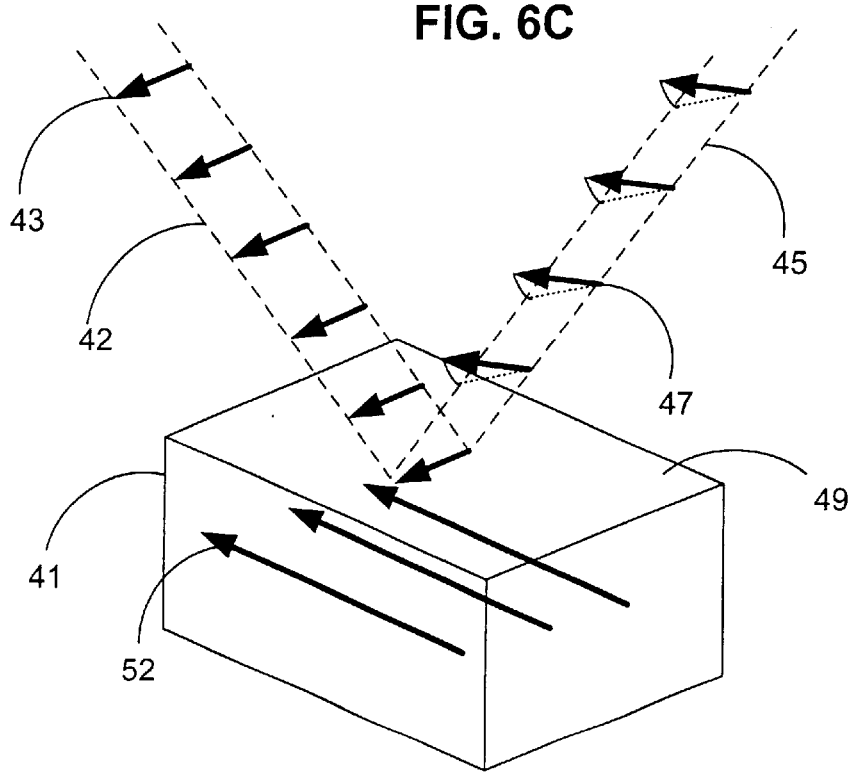

Referring to FIG. 5, there is shown an exemplary embodiment of a metrology system 50 in accordance with one or more aspects of the present invention. Metrology system 50 of FIG. 5 is similar to metrology system 10 of FIG. 1. Differences include the addition of an optical energy source, such as a laser, 34 coupled to one or more polarization detectors 39, collectively optical polarization detector 30, and optionally optical microscope 31. Polarization detectors 39 are use for determining orientation of polarization. Moreover, polarization detectors 39 may be configured to detect scattered light. A plurality of detectors 39 may be arranged as described above with respect to use of multiple detectors 11. Optical polarization detector 30 and optical microscope 31 are mounted on respective linear actuator assemblies 13. Scatterometer linear actuator assembly 13 may be in communication with information processing system 17 for controlled movement of optical polarization detector 30, and optionally optical microscope linear actuator assembly 13 may be in communication with information processing system 17 for controlled movement of optical microscope 31. Addition of optical microscope 31, which may employ white light or ultraviolet energy source, allows user intervention in deciding whether a given defect or feature should be scanned by AFM 12.

In an embodiment, optical polarization detector 30 may be used to identify one or more defects, if any, on a surface of disc media 14. Once any defect is identified, optical microscope 31 may be used to identify defect size. Alternatively to or in combination with optical viewing through microscope 31, optical polarization detector 30 may be used to detect apparent defect size. AFM probe 28 is used to measure actual defect topography based on lateral scan dimensions taken from optical microscope 31 or optical polarization detector 30. In order to observe the same defect on multiple systems, defect location must be mapped out precisely with optical polarization detector 30. Because multiple pieces of equipment are integrated so that they are on a same platform 15 and indexed to a same spindle 16, defect relocation may be achieved with greater rapidity and quickness as compared to equipment not integrated on a same platform and not indexed to a single spindle.

In another embodiment, optical polarization detector 30 may be configured to incorporate at least one of Kerr effect microscopy, ellipsometry and reflectometry, which may be in addition to scatterometry capability. AFM 12 may be configured with at least one of module 55 of magnetic force microscopy, conductance/capacitance microscopy, and face measurement in addition to conventional topography mapping functions. These additions to optical polarization detector 30 and AFM 12 enhance functionality.

As mentioned above, polarization states of light reflected from disc media 14 may be detected. More particularly, with respect to polarization detector 30, magnetization states of magnetic media of disc 14 are detected optically using the magnetic Kerr effect. A linearly polarized light, such as a laser beam, is provided to be incident on the surface of disc media 14. Polarization of reflected light from such laser beam undergoes a slight rotation with respect to that of incident light. The amount and sense of such rotation angle depends on magnetization state of the media spot from which such light is reflected.

Referring to FIGS. 6A, 6B, 6C and 6D, there are shown polarization diagrams of a portion of a linearly polarized energy source 42, such as a laser beam, reflecting off of a magnetically charged portion 41 of disc media surface 49 in accordance with the magnetic Kerr effect. Energy beam 42 comprises polarized components as indicated by arrows 43. Incident light is linearly polarized, and the plane of such polarization is perpendicular to one defined by magnetization vectors 44 of disc media portion 41. Moreover, plane of polarization of beam 42 is perpendicular to the propagation vector of beam 42. Reflected beam 45 has electric field vectors as indicated by arrows 46 wherein there is a degree of rotation of such vectors. Note that for two opposite magnetization states of disc media portion 41, corresponding rotations of electric field vectors have opposite rotation directions. For example, in FIG. 6B, direction of magnetization as indicated by arrows 48 is opposite that of FIG. 6A, and consequently rotation direction of polarization as indicated by arrows 47 is opposite that as indicated by arrows 46. Accordingly depending on direction of magnetization of disc media portion 41 with respect to that media's surface upon which a light source is incident, reflected light from such surface has a polarization that takes on an orientation associated with direction of such magnetization. This is true for perpendicularly magnetized media, such as in FIGS. 6A and 6B, as well as longitudinally magnetized media, as illustratively shown in FIGS. 6C and 6D. Thus, whether polar Kerr effect or longitudinal Kerr effect is applied, magnetization state may be detected independent of topography. In other words, upper surface 49 may be completely flat, and yet a pattern such as a servo spoke pattern can be detected. As mentioned above, once a servo spoke pattern is determined by polarization detector 30, a probe of AFM 12 may be initially positioned for purposes of scanning.

There are many possible uses for metrology system 50. Examples of such uses include carbon film thickness mapping, carbon filled thickness where in correlation with localized corrosion sights, loop thickness mapping, contact force measurements in localized sights, large-scale scratch detection, high-resolution topography in magnetic force interaction with scratches, magnetically mapping of transitions—especially in servo patterns or in a data zone, and inspecting discrete bits or individual servo patterns.

In another embodiment, instead of polarization detector 30 and/or optical microscope 31, a laser-based interferometer system that images large fields of view and captures images on a high resolution CCD may be used.

Figure 7:
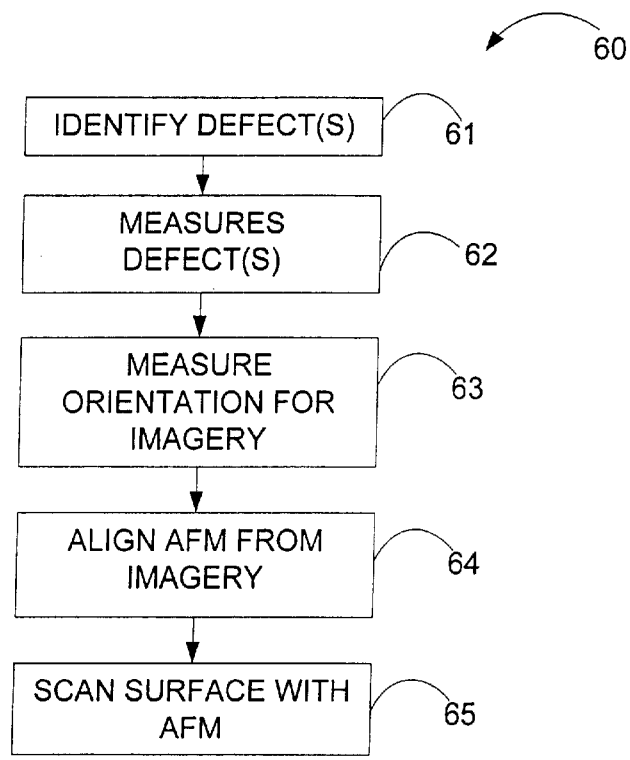
FIG. 7 is a flow diagram of an exemplary embodiment of a metrology process in accordance with one or more aspects of the present invention.

Referring to FIG. 7, there is shown a flow diagram of an exemplary embodiment of a metrology process 60 in accordance with one or more aspects of the present invention. With continuing reference to FIG. 7 and renewed reference to FIG. 5, at step 61 defects are identified. This is done by use of an optical microscope 31 or optical polarization detector assembly 30. At step 62, such defects are measured. This is done by use of an optical microscope 31 or optical polarization detector assembly 30, the latter of which may comprise one or more detectors to measure both optical scatter and polarization. At step 63, magnetic or topographic orientation is measured. Magnetic orientation is measured by use of polarization detector 30, for example using a Kerr effect. This will produce a magnetic image, which may be used to disclose a pattern, such as a servo pattern. Topographic orientation may be measured as described above. At step 64, AFM 12, which may be configured with a magnetic force microscopy module 55, is aligned, for example to such servo pattern, using such magnetic image, or a topographic image as described above. At step 65, disc media surface is scanned by AFM 12.

Accordingly, defects may be identified, as well as generation of topographic and magnetic images of a disc media surface.

Figure 8:
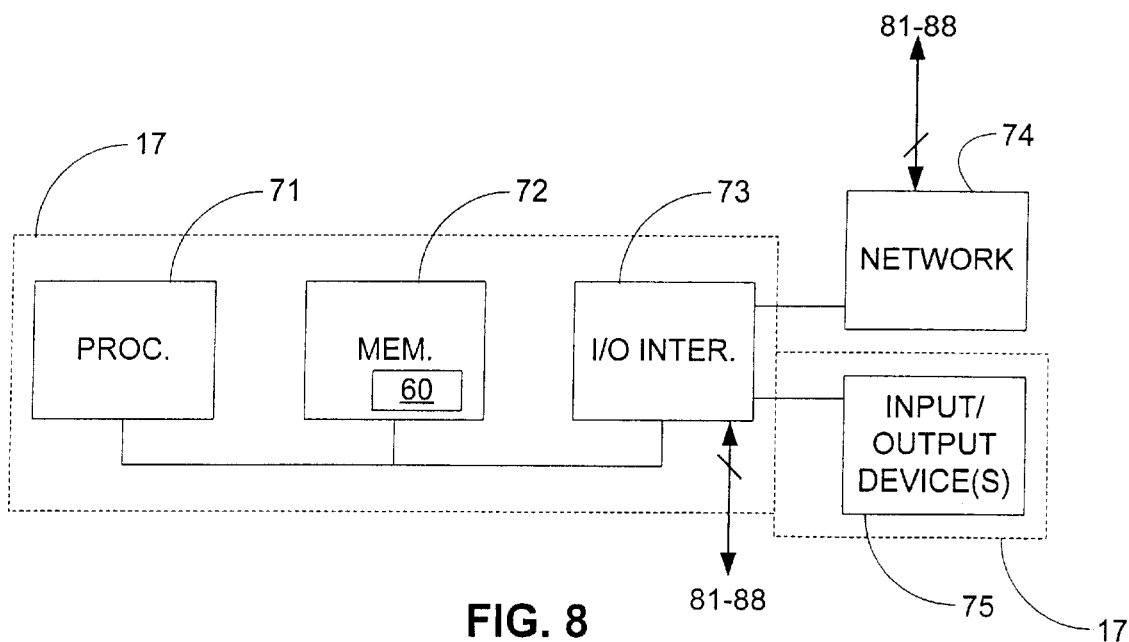
FIG. 8 is a block diagram of an exemplary embodiment of an information processing system configured in accordance with one or more aspects of the present invention.

Referring to FIG. 8, there is shown a block diagram of an exemplary embodiment of an information processing system 17 configured in accordance with one or more aspects of the present invention. Information processing system 17 comprises processor, such as a microprocessor, 71, memory 72, such as random access memory, read only memory, magnetic memory, optical storage memory, and the like, and input output (I/O) interface 73. Additionally, information processing system 17 may comprise one or more input and/or output devices 75, such as a display, a keyboard, a curser positioning device, a printer, and the like. Information processing system may be coupled to a network 74. Memory 72 may comprise all or a portion of process 60 for automatically identifying defects in accordance therewith.

With renewed reference to FIGS. 1 and 5 and continuing reference to FIG. 8, one or more of signals 81, 82, 83, 84, 85, 86, 87 and 88 are provided to I/O interface 73. Alternatively, one or more of signals 81, 82, 83, 84, 85, 86, 87 and 88 may be provided to information processing system 17 via a network 74 coupled to I/O interface 73. Signals 86 and 87 are similar to above described signal 82, but are for linear movement of optical microscope 31 and optical polarization detector 30, respectively, instead of AFM 12. Signal 85 is similar to above described signal 81, except detector 11 is not coupled to AFM 12 in the embodiment shown in FIG. 5; rather, optical polarization detector 30 provides and is provided with information to and from information processing system 17 via signal 88.

While foregoing is directed to the preferred embodiment of the present invention, other and further embodiments of the invention may be devised without departing from the basic scope thereof, and the scope thereof is determined by the claims that follow.

What is claimed is:

1. An apparatus for metrology on a media, comprising:
    a stage;
    a spindle configured to support the media;
    a first linear actuator coupled to the stage;
    a second linear actuator coupled to the stage;
    a polarization detector coupled to the first linear actuator and positionable to scan the media, the polarization detector configured to provide optical energy incident on the media and to detect change in polarization of the optical energy reflected from the media to provide magnetic imagery of the media;
    an atomic force microscope connected to the second linear actuator and positionable to scan the media, the atomic force microscope configured for magnetic microscopy; and
    the polarization detector and the atomic force microscope indexed to the spindle.

2. The apparatus of claim 1 wherein the stage is rotatable for rotating the polarization detector and the atomic force microscope at least partially around the spindle, the spindle centrally disposed with respect to the stage.

3. The apparatus of claim 2 further comprising:
    a third linear actuator connected to the stage; and
    an optical microscope connected to the third linear actuator for radial movement to and away from the central point of the spindle.

4. The apparatus of claim 3 further comprising an information processing system in electrical communication with the first linear actuator, the second linear actuator and the third linear actuator.

5. The apparatus of claim 2 wherein the magnetic imagery is a servo pattern.

6. The apparatus of claim 1 wherein the first linear actuator and the second linear actuator are configured to provide radial movement to and away from a central point of the spindle, and the spindle is configured to rotate the media.

7. The apparatus of claim 1 further comprising an information processing system in communication with the atomic force microscope and the polarization detector and programmed to provide positioning information thereto for positioning the atomic force microscope and the polarization detector.

8. The apparatus of claim 7 wherein the information processing system is configured to process reflectance information from the polarization detector to provide the magnetic imagery and to process scan information from the atomic force microscope.

9. The apparatus of claim 8 wherein the information processing system is in electrical communication with the first linear actuator and the second linear actuator, the information processing system configured to position the polarization detector and the atomic force microscope radially toward and way from the spindle.

10. The apparatus of claim 1 wherein the polarization detector comprises a plurality of detectors.

11. The apparatus of claim 10 wherein the polarization detector comprises a laser for providing a linearly polarized beam.

12. A method for scanning a media, comprising:

providing a polarization detector providing an atomic force microscope having a magnetic microscopy module;

providing a platform;

providing a first linear actuator coupled to the platform and the polarization detector;

providing a second linear actuator coupled to the platform and the atomic force microscope;

providing a spindle centrally located with respect to the platform;

detecting with the polarization detector a servo pattern magnetically written to the media; and positioning the atomic force microscope in response to the servo pattern for the scanning of the media with the atomic force microscope.

13. The method of claim 12 further comprising providing an optical microscope for detection of a defect.

14. The method of claim 12 further comprising:

providing an information processing system in communication with the first linear actuator, the second linear actuator, the polarization detector and the atomic force microscope; and the positioning of the atomic force microscope under control of the information processing system.

15. The method of claim 12 wherein the spindle is configured to rotate the media for the scanning.

16. The method of claim 15 wherein the platform is configured for at least partial rotation around the spindle.

17. The method of claim 12 wherein the polarization detector comprises a plurality of detectors.

18. An apparatus for scanning a media, comprising:

means for supporting and rotating the media;

means for detecting polarization for providing a magnetic image of the media indexed to the means for supporting and rotating the media;

means for probing the media for providing a topographic image indexed to the means for supporting and rotating the media; and means for providing a common rotatable platform for the means for detecting polarization and the means for probing.

19. The apparatus of claim 18 further comprising information processing means in communications with the means for probing and the means for detecting polarization for processing information respectively therefrom to provide the magnetic image and the topographic image.

20. The apparatus of claim 19 wherein the magnetic image is a servo pattern.

* * * * *